Dec. 22, 1970 T. R. REINHART 3,549,992
ELECTRICAL APPARATUS RESPONSIVE TO INDUCTIVE REACTANCE
FOR MEASURING DISTANCE ALONG A PAIR OF CONDUCTORS
Filed March 31, 1967
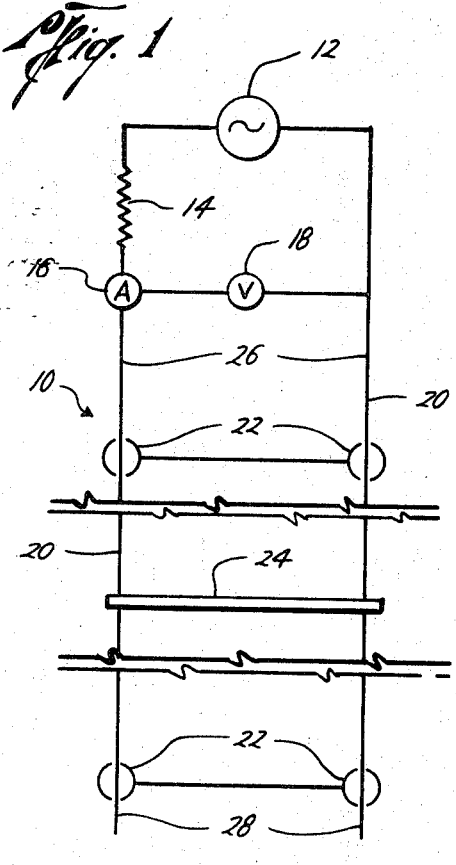
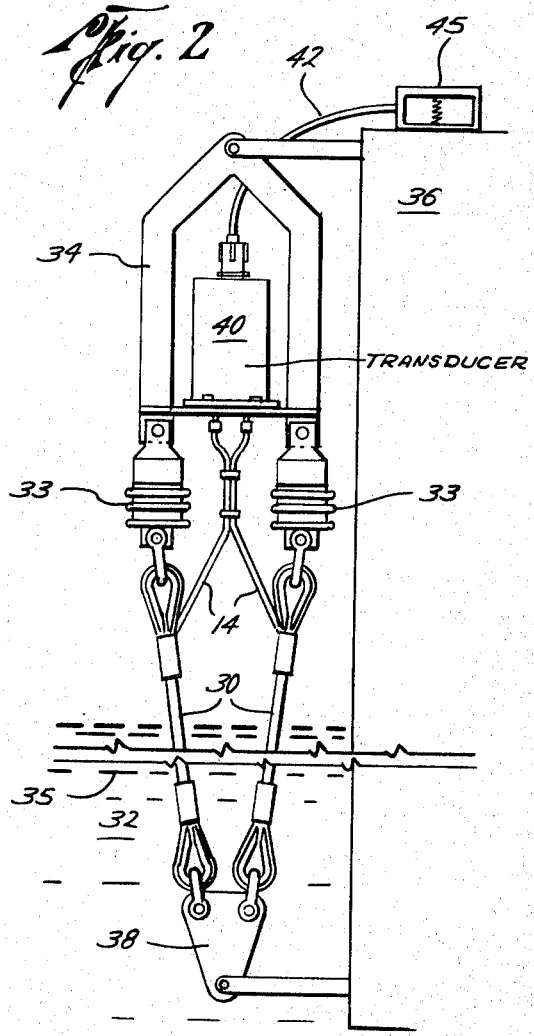
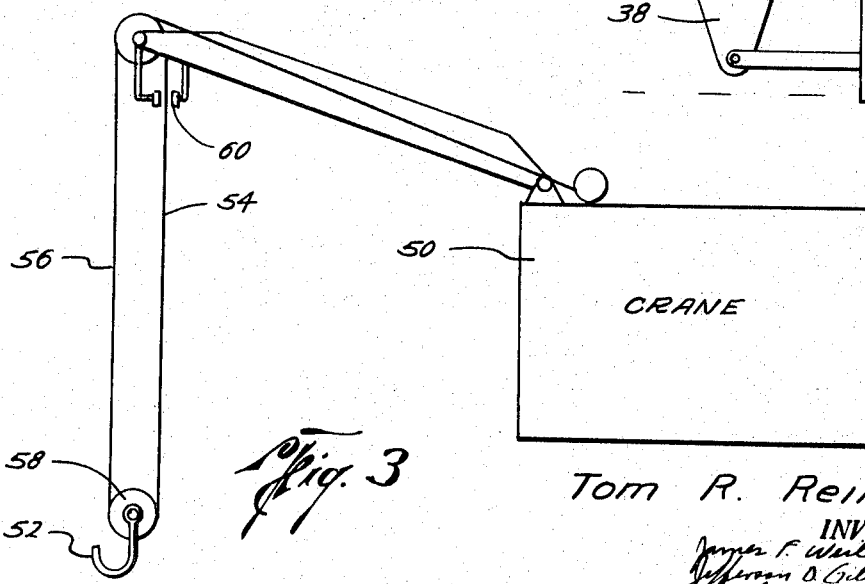
Tom R. Reinhart
INVENTOR
BY
ATTORNEYS United States Patent Office 3,549,992
Patented Dec. 22, 1970

3,549,992
ELECTRICAL APPARATUS RESPONSIVE TO INDUCTIVE REACTANCE FOR MEASURING DISTANCE ALONG A PAIR OF CONDUCTORS
Tom R. Reinhart, 5310 Glenmont Drive,
Houston, Tex. 77036
Filed Mar. 31, 1967, Ser. No. 627,509
Int. Cl. G01r 27/00
U.S. Cl. 324—57
8 Claims

ABSTRACT OF THE DISCLOSURE

An apparatus electrically responsive to the inductance of a plurality of electrical conductors to be short circuited by an electrically conductive object whose position is to be measured including means for applying and detecting signals on the conductors in which the frequency of the signal and the size and spacing of the conductors are selected so that the position of the conductive object along the conductors is responsive only to changes in the inductive reactance of the conductors.

BACKGROUND OF THE INVENTION

The present invention relates to an apparatus for electrically measuring the position or distance of an electrical conductive object along a plurality of electrical conductors adapted to be shorted by the object by selecting the frequency of an applied AC signal to the conductors, the size of the conductors, and the spacing of the conductors from each other whereby the distance or position of the object along the conductors is primarily a function of the inductive reactance, and thus the position of the object can be ascertained by measurement of the inductive reactance.

In general, distance measuring devices have been used in the past such as in measuring liquid levels in which measurements of the resistance or capacitance of electrical conductors were made to determine the distance to some object, element or interface whose position varied the resistance or capacitance. However, although it is recognized that prior art devices present a satisfactory solution to problems encountered in many applications, this invention provides advantages that overcome the limitations of prior art devices in a wide variety of applications.

SUMMARY

The present invention is directed to applying an electrical alternating current signal to a plurality of electrical conductors and measuring the distance of an object, by way of example only, fluid level or any other electrically conductive object which electrically shorts out the conductors, and measuring the position of that object along the conductors by measuring only the inductive impedance of the conductors to the short circuit. In particular, the apparatus of the present invention is made responsive to changes only in the inductive reactance in which response to capacitative or resistance impedances is made purposely negligible and is brought about by proper selection of the conductors size and spacing, and the frequency of the alternating current excitation signal applied to the conductors. The parameters of the system are chosen specifically so that the measure of the position of the shorting object is determined by the inductance of the conductors to the point of the short circuit and other external conditions, factors and surrounding conditions do not adversely affect the measured property of inductance. In particular, the frequency of the alternating current signal applied to the conductors is made such that the range of distance measurements is less than a quarter wave length of the applied signal or functions thereof to insure that the impedance of the electrical conductors is inductive over the desired measurement range. In addition, the inductive reactance of the conductors is made sufficiently great as compared to the resistive reactance of the conductors so that the resistive reactance is negligible, and thus the measurement is free from the disadvantages of prior resistive measuring instruments in which resistance variations due to such factors as temperature, mechanical contacts, etc. do not affect the parameter being measured. The magnitude of the inductive reactance to the resistive impedance is controlled by proper selection of the excitation frequency, the cross-sectional area of the conductors, and their spacing from each other.

Therefore, it is one object of the present invention to provide electrical apparatus for measuring the inductance of a pair of electrical conductors for example, adapted to be shorted out by an object whose position along the conductors is to be measured by providing means for applying an alternating current signal across the conductors and means for measuring the impedance of the conductors in which the frequency of the alternating current signal being selected is such that the range of the distances being measured falls within $$\frac{2n\lambda}{4} \text{ to } \frac{2n+1}{4}\lambda$$

where $n$ is any positive integer including zero and $\lambda$ is the wave length of the alternating current signal, and the inductive reactance of the conductors is sufficiently greater than the resistance of the conductors so that the resistance will not affect the desired sensitivity.

A still further object is the improvement in the apparatus for electrically measuring the distance of an electrically conductive object along a pair of parallel electrical conductors for example, which are shorted by the object and where an electrical alternating current signal source is applied to the conductors in which the frequency of the alternating current signal is less than $c/4L$, where $c$ is nominally $3 \times 10^8$ meters/sec. and L is the length of the conductor so that the impedance will be inductive at the point of measurement, but the frequency of the alternating current signal is sufficiently greater so that the inductive reactance of the unshorted conductors is sufficiently greater than the resistance of the conductors so that the resistance will not affect the desired sensitivity.

Still a further object of the present invention is the provision of an electrical measuring device for measuring the inductance of a plurality of electrical conductors for measuring the position or distance of an electrical conductive object shorting out the conductors at some point along the conductors in which the parameters of the applied signal frequency to the conductors, the cross-sectional area of the conductors, and the spacing of the conductors is selected so that the impedance measuring means will be responsive only to the inductive reactance of the conductors to the point of the applied short circuit.

BRIEF DESCRIPTION OF THE DRAWINGS

In the attached drawings, like character references refer to like parts throughout the several views in which, FIG. 1 is an electrical schematic of the present invention, FIG. 2 is an elevational view of the present invention, in use for measuring water level and wave heights of water, and FIG. 3 is an elevational view illustrating the use of the present invention in use for measuring the position of a crane pickup hook.

DESCRIPTION OF THE PREFERRED EMBODIMENT

The present invention is responsive to changes in inductive reactance in which any response to capacity or resistance properties is deliberately made negligible. An alternating current voltage source is provided as an excitation signal, and a detector responsive to the corresponding current of voltage or function thereof is provided for measuring the impedance. The impedance to the excitation voltage signal is determined primarily by the effective inductance formed by the pair of electrical conductors and is made responsive to a change in distance to the shorted object. This predominance of inductive reactance as the measured circuit element is obtained by the proper choice of conductor size and spacing and the alternating current excitation frequency.

Referring now to FIG. 1, the present invention is generally indicative by the reference numeral 10. The apparatus 10 includes a source of alternating electric voltage 12 having a source impedance 14, suitable impedance measuring means which may include an ammeter 16 and a voltmeter 18 although any suitable conventional impedance measuring device may be used, and a pair of parallel electrical conductors 20 which are connected to the alternating current generator 12 whereby the alternating current signal from the generator is applied thereto. Suitable insulated spacers 22 are provided to maintain the electric conductors 20 at a fixed distance apart throughout their length. Also illustrated is an electrically conductive object such as a metal bar 24 which provides a short between the conductors 20 and is movable from ends 26 to end 28 of the electrical conductors 20.

Given the proper selection of system parameters, as will be more fully described hereinafter, the inductive impedance of the unshorted portion of the pair of electrical conductors 20 will vary as the metal bar 24 is moved from the ends 26 toward the ends 28 of the conductors 20. The measurement of the inductive reactance determines the position of the metal bar or the distance of the metal bar 24 from the inductance measuring means. As will be explained, the system parameters are selected such that the inductive reactance is predominant and is made sufficiently greater than the resistance of the circuit so that the impedance measuring means measures only the inductive reactance. Also, since the point of measurement is a short circuit and may be grounded, response to capacity reactance between electrical conductors and nearby surrounding objects can be made negligable. Thus, as the impedance measured at ends 26 varies from zero when the metal bar is at ends 26 to a maximum when the short circuit metal bar is at the ends 28, the current indicated by the ammeter 16 will be inversely proportional to the amount of impedance and the voltage measured by the voltmeter 18 will be directly proportional to the amount of impedance and thus either the ammeter 16 or the voltmeter 18 or other conventional measuring apparatus may be used to measure the distance from the ends 26 to the point at which the metal bar 24 shorts across the electrical conductors 20.

First, the parameter being measured is the inductive reactance as the electrical short circuit moves from one end to the other along the pair of parallel conductors 20. The impedance of a pair of parallel electrical conductors, neglecting the resistance, and which are short circuited at some distance X from one end is as follows:

$$Z = 267j \log\left(\frac{2s}{d}\right) \tan\left(\frac{2\pi X}{\lambda}\right)$$

Equation 1 where, $Z$ = the impedance $j$ = shorthand notation for $\sqrt{-1}$, signifying nonresistive reactance, log = logarithm to the base 10, $d$ = diameter of the electrical conductors, $s$ = the center to center spacing of the pair of electrical conductors, tan = tangent trigonometric function, $X$ = the distance from the measured end to the short circuit along the end of the electrical conductors, $\pi$ = circular constant, 3.14159 . . .

$\lambda$ = the wave length of the electrical excitation signal applied to the parallel electrical conductors.

For impedance of the pair of parallel electrical conductors 20 to be inductance over the entire desired range of measurement L, the entire length of the conductors 20, the value of Equation 1 must be positive as X goes from $X=0$ to $X=L$. Obviously, since the conductor diameter $d$ cannot exceed the spacing of $s$, the logrithmic term is always positive. However, the tangent of $2\pi X/\lambda$ goes to zero as $X=0$ to tangent of $2\pi X/\lambda$ at $L=_L$. Since the tangent changes sign from positive for angles below $\pi/2$ to negative for angles greater than $\pi/2$, the range of measurement L must be less than $\lambda/4$ for the measurement to be inductive. Of course, the measurement will be inductive for greater distances if the distances being measured fall within the range $$\frac{2n}{4}\lambda \text{ to } \frac{2n+1}{4}\lambda$$

where $n$ is any positive integer including zero.

The wave length $\lambda$ of electrical energy in free space is:

$$\lambda = \frac{c}{f}$$

Equation 2 where:

$c$ = velocity of light or $3 \times 10^8$ meters/sec. (for purposes of simplicity the slight reduction in velocity of electrical energy on real conductors is neglected).

$f$ = excitation frequency of the applied voltage.

Since L must be less than $\lambda/4$, the use of Equation 2 provides that L must be less than $c/4f$ or alternatively the applied excitation signal frequency is as follows:

$$f \text{ max.} = \frac{c}{4L}$$

Equation 3

By way of example, assume that the length L of a system which is to be 30 meters long, the maximum frequency of the alternating current signal that can be utilized and still provide an inductive reading at the measuring instrument would be computed as follows $$f \text{ max.} = \frac{3 \times 10^8}{4 \times 30} = 2.5 \text{ megacycles}$$

Equation 3a

However, in order to insure that the impedance measuring means measures the position or distance of the shorted object as a function of only the inductive reactance, it is important that resistance of the system is negligible as compared to the inductive reactance, and thus does not enter into the determination of the distance of the shorting object.

It is particularly undesirable to allow the resistive components of impedance to affect the read out signals since the conductors resistance varies and is affected by such factors as temperature, mechanical connections, the contact with the shorting object and other factors which limit the precision and application of the prior art type of resistance measuring means. Therefore, another feature of the invention is the selection of the parameters of the system so that the resistive components of the impedance of the electrical conductors is many times less than the inductive reactance to which it is desired that the system be responsive. From Equation 1, for parallel conductors it is noted that the inductive reactance is a function of frequency, the diameter of the conductors 22 and the spacing between the conductors 22. In terms of the logrithmic multiplying factor, log $(2s/d)$ it is noted that the actual size of the conductor is unimportant so far as the reactive impedance is concerned, but that the ratio of the size to the spacing of the diameter governs the impedance.

The resistance of the electrical loop consisting of the parallel conductors 20 is:

$$R = \frac{\rho L}{A}$$

where:
R=loop resistance in ohms,
L=total length of conductors,
A=cross-sectional area of the conductor,
$\rho$=a conductor volume resistivity.
But since $$A = \frac{\pi d^2}{4}, \quad R = \frac{4\pi \rho L}{d^2}$$

Equation 4

From Equation 4 it is noted that as the diameter increases the resistance will decrease. Therefore, if it is desired to make the inductive reactance any particular amount greater than that of the resistance, this can be accomplished by a proper selection of the necessary parameters. For instance, if it is decided that a ratio of 100/1 for the ratio of inductive reactance to resistance is necessary to yield a sufficient freedom from the effect of resistance, then the inductive reaction of Equation 1 is equated to 100 times the loop resistance of the parallel electrical conductors of Equation 4, such that:

$$276 \log\left(\frac{2s}{d}\right) \tan\left(\frac{2\pi L}{\lambda}\right) = 100 \times \frac{4\rho L}{\pi d^2}$$

Equation 5

The above equation can be solved by assuming a ratio of $2s/d$ to yield inductive reactance and then solving for the value of $d$ required to give the desired low resistance. Since the ratio of $2s/d$ has been initially presumed, using the presumed value of $2s/d$ and the value found for $d$ determines the spacing $s$.

In the event that the geometry and size of the system is already fixed, that is the values of $d$ and $s$ are in existence or fixed; it is necessary to then calculate a minimum excitation frequency to insure that the inductive re actance exceeds the resistance by a desired ratio. This can be accomplished easily for parallel conductors by the use of Equation 5 assuming that a 100/1 ratio is desired. Note that frequency is related to $\lambda$ as given by Equation 2. In the event the solution provides a minimum excitation frequency below the maximum excitation frequency is required by Equation 3, then a possible solution is provided. On the other hand, if the minimum excitation frequency of the fixed system as determined by Equation 5 is greater than the maximum excitation frequency as required by Equation 3, a solution is not possible with the given set of system geometry.

While the present invention is suitable for measuring the distance of any electrical conductive object shorting out between the pair of conductors 20, one such application is shown in FIG. 2 for measuring the sea and wave elevation. In addition, while the example shown in FIG. 1 was that of parallel round conductors for reasons of simplicity and clarity, other forms of conductors, that is noncircular and other forms of spacing not parallel may be used to provide specific results in certain applications. Thus, in FIG. 2 a pair of electrical conductors 30 are provided which taper towards each other and in which the lower end is adapted to be immersed in the water 32 and is thus shorted by the water, the object to be measured. The top of the conductors 30 may be supported from insulators 33 which are in turn supported from a frame 34 connected to a supporting structure such as an offshore platform 36. The lower end of the conductors 30 are connected to a clevis 38 thereby maintaining the conductors in position and supporting them and which is in turn connected to the offshore platform 36 thereby maintaining the conductors 30 sufficient tension to prevent them from being excessively moved by the water movement. A suitable and conventional transducer 40 is provided for supplying the alternating current signal from an internal generator or a cable 42 to a pair of conducting cables 14 which are in turn connected to the conductors 30. The cable 42 also contains sufficient electrical connections leading to an indicator or recorder 45 for measuring the impedance of the conductors 30. Thus, as the wave length and water level 35 varies along the conductors 30, an electrical short will be provided between the conductors 30. Thus assuming that the system is constructed in accordance with the parameters previously described, the inductance of the conductors 30 to the point of the short circuit will vary and be measured by suitable impedance measuring means in accordance with the position of the water 35 across the conductors 30 thereby providing indication of the wave height and water level. An additional advantage is provided by tapering the conductors 30 in accordance with the tangent function of Equation 1 so that the readout of the impedance will be linear.

Referring now to FIG. 3, a crane 50 is illustrated in which the present invention is utilized for measuring the position of the crane hook 52. In this application the crane cable itself is used as a pair of parallel conductors by utilizing the crane cable portion 54 and 56 whereby the lower crane pulley 58 connected to the hook 52 acts as a short circuit bar. A conventional electrical transformer device 60 is provided adjacent to the cable portion 54 for inducing an electrical signal therein by transformer action and measuring the impedance of the variable length of parallel electrical conductors formed by the crane cables by means previously described and thereby measuring the position of the crane pickup hook 52.

What is claimed is:
1. An apparatus for electrically measuring the position of an electrically conductive object comprising,
    a plurality of electrical conductors adapted to be shorted by said object,
    means for applying an alternating current signal across the conductors,
    means for measuring the impedance of the conductors,
    the frequency of the alternating current signal being less than $c/4L$, where $c$ is $3 \times 10^8$ meters/sec., and L is the length of said conductors, whereby the reactance will be inductive at the point of measurement, and
    the inductive reactive reactance of the conductors being sufficiently greater than the resistance of the conductors so that the resistance will not affect the desired sensitivity.

2. The apparatus of claim 1 further including means for decreasing the distance between the conductors wherein the distance between the conductors is decreased as the conductors are tapered toward each other from the point at which the signal is applied to the conductors.

3. The apparatus of claim 2 wherein the angle of the taper between the conductors is in accordance with the function tangent $2\pi L/\lambda$ where:
    L is the length of the conductors,
    $\lambda$ is the wave length of the electrical signal applied to the conductors.

4. An apparatus for electrically measuring the distance of an electrically conductive object from a measuring point comprising,
    a plurality of electrical conductors adapted to be shorted by said object,
    means for applying an alternating current signal across the conductors at one end, means at said measuring point at said one end for measuring the impedance of the conductors, the frequency of the alternating current signal being selected so that the range of distance being measured falls within $$\frac{2n\lambda}{4} \text{ to } \frac{2n+1}{4}\lambda$$

where $n$ is any positive integer including zero and $\lambda$ is the wave length of the alternating current signal, and the frequency of the signal being large enough so that the inductive reactance of the conductors is sufficiently greater than the resistance of the conductors so that the resistance will not affect the desired sensitivity.

5. An apparatus for electrically measuring the distance of an electrically conductive object from a measuring point comprising, a pair of parallel electrical conductors adapted to be electrically shorted by said object, means for applying an alternating current signal across the conductors at one end, means at said measuring point at said one end for measuring the impedance of the conductors, the frequency of the alternating current signal being selected so that the range of distance being measured falls within $$\frac{2n\lambda}{4} \text{ to } \frac{2n+1}{4}\lambda$$

where $n$ is any positive integer including zero and $\lambda$ is the wave length of the alternating current signal, and the inductive reactance of the conductors is sufficiently greater than the resistance of the conductors so that the resistance will not affect the desired sensitivity.

6. The apparatus of claim 5 wherein the cross-sectional area of the conductors, the spacing between the conductors and the frequency of the alternating current signal is sized to provide that the inductive reactance of the conductors is a preselected factor greater than the resistance of the conductors.

7. An apparatus for electrically measuring the distance of an electrically conductive object from a known position comprising, a pair of parallel electrical conductors adapted to be electrically shorted by said object, means for applying an alternating current signal across the conductors at said known position at one end, means at said one end for measuring the impedance of the conductors at the applied frequency of the alternating current signal, the frequency of the alternating current signal being less than $c/4L$, when $c$ is $3\times10^8$ meters/sec., and $L$ is the length of said conductors whereby the measured impedance will be inductive at the point of measurement, and the frequency of the alternating current signal being sufficiently great so that inductive reactive reactance of the conductors is sufficiently greater than the resistance of the conductors so that the resistance will not affect the desired sensitivity.

8. The apparatus of claim 5 wherein the cross-sectional area of the conductors, the spacing between the conductors and the frequency of the alternating current signal are sized such that $$276 \log\left(\frac{2s}{d} \tan\left(\frac{2\pi L}{\lambda}\right)\right)$$

is sufficiently larger than $4\rho L/\pi d^2$ so that the resistance does not significantly affect the impedance reading wherein $s$=the center to center spacing of the pair of electrical conductors, $d$=diameter of the electrical conductors, $L$=total length of conductors, $\lambda$=the wave length of the electrical excitation signal applied to the parallel electrical conductors, $\rho$=a conductor volume resistivity.

References Cited

UNITED STATES PATENTS

| | | | |
|---|---|---|---|
| 1,532,871 | 4/1925 | Bloch | 73—304X |
| 2,138,677 | 11/1938 | Meyer | 73—304X |
| 2,817,234 | 12/1957 | Campbell | 73—304 |
| 2,941,069 | 6/1960 | Duteil | 246—34 |
| 3,155,350 | 11/1964 | Campbell | 246—122 |

FOREIGN PATENTS

| | | | |
|---|---|---|---|
| 861,850 | 3/1961 | Great Britain | 246—122 |

OTHER REFERENCES

Slater, J. C., Microwave Transmission, N.Y., McGraw-Hill Book Company, Inc., 1942, pp. 15, 19, 27.

EDWARD E. KUBASIEWICZ, Primary Examiner

U.S. Cl. X.R.

73—304; 324—59